United States Patent
Hosono et al.

(10) Patent No.: US 11,946,151 B2
(45) Date of Patent: Apr. 2, 2024

(54) ELECTROLYTIC CELL AND ELECTROLYTIC DEVICE

(71) Applicant: JAPAN SCIENCE AND TECHNOLOGY AGENCY, Kawaguchi (JP)

(72) Inventors: Hideo Hosono, Tokyo (JP); Toshiharu Yokoyama, Tokyo (JP); Yoshitake Toda, Tokyo (JP); Shintaro Ishiyama, Niigata (JP); Masami Taguchi, Akita (JP); Hiroki Takahashi, Akita (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 642 days.

(21) Appl. No.: 17/040,853

(22) PCT Filed: Mar. 28, 2019

(86) PCT No.: PCT/JP2019/013888
§ 371 (c)(1),
(2) Date: Sep. 23, 2020

(87) PCT Pub. No.: WO2019/189701
PCT Pub. Date: Oct. 3, 2019

(65) Prior Publication Data
US 2021/0025063 A1    Jan. 28, 2021

(30) Foreign Application Priority Data

Mar. 29, 2018  (JP) .................. 2018-066164

(51) Int. Cl.
*C25B 9/17* (2021.01)
*C01B 32/40* (2017.01)
*C25B 11/069* (2021.01)

(52) U.S. Cl.
CPC ............... *C25B 9/17* (2021.01); *C01B 32/40* (2017.08); *C25B 11/069* (2021.01)

(58) Field of Classification Search
CPC .................................... C25B 1/23; C25B 1/02
See application file for complete search history.

(56) References Cited

U.S. PATENT DOCUMENTS

2002/0172726 A1*  11/2002  Hosono .................. A01N 59/06
                                                        424/688
2005/0061657 A1*   3/2005  Hosono .................. C01B 13/02
                                                        422/186.04
(Continued)

FOREIGN PATENT DOCUMENTS

EP          1 454 878 A1      9/2004
JP        2006198563 A         8/2006
(Continued)

OTHER PUBLICATIONS

Toda et al, Activation and splitting of carbon dioxide on the surface of an inorganic electride material, Nature Communications, vol. 4, Article No. 2378, Aug. 2013, pp. 1-8 (Year: 2013).*

(Continued)

*Primary Examiner* — Harry D Wilkins, III
(74) *Attorney, Agent, or Firm* — BUCHANAN, INGERSOLL & ROONEY PC

(57) ABSTRACT

An electrolytic cell capable of simply electrolyzing carbon dioxide into carbon monoxide and oxygen with low activation energy, and an electrolytic device. The carbon dioxide electrolytic cell includes a cathode, an anode, and a solid electrolyte having oxide ion conductivity. The cathode is the following (A) or (B); (A) a metal and a first mayenite-type compound are included therein or (B) a metal and a second mayenite-type compound are included therein, said second (Continued)

mayenite type compound including a mayenite type compound having electron conductivity.

8 Claims, 3 Drawing Sheets

(56) References Cited

U.S. PATENT DOCUMENTS

| | | | |
|---|---|---|---|
| 2007/0045125 A1* | 3/2007 | Hartvigsen | C25B 1/00 |
| | | | 205/637 |
| 2009/0004072 A1 | 1/2009 | Hamamoto et al. | |
| 2015/0038741 A1* | 2/2015 | Pedersen | C25B 9/70 |
| | | | 204/278 |

FOREIGN PATENT DOCUMENTS

| | | |
|---|---|---|
| JP | 2007179916 A | 7/2007 |
| JP | 2010261086 A | 11/2010 |
| JP | 2012025636 A | 2/2012 |
| JP | 2012183474 A | 9/2012 |
| JP | 2013173980 A | 9/2013 |
| JP | 2013237901 A | 11/2013 |
| JP | 2015-122286 A | 7/2015 |
| JP | 2015122287 A | 7/2015 |
| KR | 10-2008-0014956 A | 2/2008 |

OTHER PUBLICATIONS

Liao et al, Characteristics, Thermodynamics, and Preparation of Nanocaged12CaO-7Al2O3and Its Derivatives, International Journal of Applied Ceramic Technology, vol. 13, No. 5, Sep. 2016, pp. 844-855 (Year: 2016).*

Tsypkin et al, Catalytic Layers in a Reversible System Comprising an Electrolyzing Cell and a Fuel Cell Based on Solid Polymer Electrolyte, Russian Journal of Electrochemistry, vol. 36, No. 5, May 2000, pp. 545-548 (Year: 2000).*

Notice of Allowance and Search Report dated Sep. 27, 2022, by the State Intellectual Property Office of the People's Republic of China in corresponding Chinese Patent Application No. 201980021055.1 and an English translation of the Search Report. (6 pages).

Hamamoto et al., "Simultaneous Removal of Nitrogen Oxides and Diesel Soot Particulate in Nano-structured Electrochemical Reactor", Solid State Ionics, (Oct. 31, 2006), vol. 177, No. 26-32, pp. 2297-2300.

Extended European Search Report dated Dec. 20, 2021, by the European Patent Office in corresponding European Patent Application No. 19776652.0-1108. (8 pages).

International Search Report (PCT/ISA/210) and an English translation thereof, Written Opinion (PCT/ISA/237) dated Jun. 25, 2019, by the Japanese Patent Office as the International Searching Authority for International Application No. PCT/JP2019/013888.

Office Action (Decision for Grant of Patent) dated Dec. 18, 2023, by Korean Intellectual Property Office in corresponding Korean Patent Application No. 10-2020-7027363 (6 pages).

* cited by examiner

ELECTROLYTIC CELL AND ELECTROLYTIC DEVICE

BACKGROUND OF THE INVENTION

Field of the Invention

The present invention relates to an electrolytic cell and an electrolytic device.

Description of Related Art

As a target for reducing greenhouse gas becomes mandatory on a global scale (Paris Agreement), carbon dioxide sequestration and carbon dioxide decomposition are being actively studied, and among them, electrolysis is attracting attention as one of new options.

For example, a method of decomposing $CO_2$ gas into solid carbon and $O_2$ gas using molten salt as an electrolyte has been proposed (for example, Patent Document 1).

A method of electrolyzing carbon dioxide into carbon monoxide and oxygen by using a defect transfer type oxide ion conductor such as yttria stabilized zirconia (hearafter, referred to as "YSZ".) formed by adding $Y_2O_3$ to $ZrO_2$ as an electrolyte has been proposed (for example, Patent Document 2).

[Patent Document 1] Japanese Unexamined Patent Application Publication No. 2013-237901

[Patent Document 2] Japanese Unexamined Patent Application Publication No. 2013-173980

SUMMARY OF THE INVENTION

Problem to be Solved

However, when the molten salt is used as an electrolyte, there is a problem that it is unsuitable for industrial applications such as a problem of a container for holding molten salt at a high temperature.

Further, when a defect transfer type oxide ion conductor such as yttria stabilized zirconia or a molten salt is used as an electrolyte, there is a problem that irreversible blackening occurs when an excessive oxide ion current is applied, and the mechanical strength of a portion where blackening occurs is reduced because the crystal skeleton is broken.

Means to Solve the Problem

The present inventors have found that carbon dioxide can be easily electrolyzed into carbon monoxide and oxygen with an activation energy lower than that of a conventional method by using a mayenite type compound as an electrode. That is, the present invention is as follows:

[1] A electrolytic cell comprising:
a cathode,
an anode, and
a solid electrolyte having oxide ion conductivity;
wherein
the cathode is following (A) or (B):
(A) the cathode comprises a metal and a first mayenite-type compound, or
(B) the cathode comprises a metal and a second mayenite-type compound, wherein the second mayenite-type compound comprises a mayenite-type compound having electronic conductivity;

each of the first mayenite-type compound and the second mayenite-type compound is a mayenite-type compound having a representative composition represented by $12CaO \cdot 7Al_2O_3$;
the first mayenite-type compound and the second mayenite-type compound are the same or different; and
the mayenite-type compound comprises Al and at least one element selected from the group consisting of Ca and Sr, and a molar ratio of a sum of CaO and SrO to $Al_2O_3$ in terms of oxides is 12.6:6.4 to 11.7:7.3.

[2] The electrolytic cell according to [1], wherein the mayenite-type compound comprises:
  (i) at least one element selected from the group consisting of B, Si and Ge, and total amount thereof is 0 to 17 mol % in terms of oxides with respect to the mayenite-type compound;
  (ii) at least one element selected from the group consisting of Li, Na, and K, and total amount thereof is 0 to 5 mol % in terms of oxides with respect to the mayenite-type compound;
  (iii) at least one element selected from the group consisting of Mg and Ba, and total amount thereof is 0 to 10 mol % in terms of oxides with respect to the mayenite-type compound; and
  (iv) at least one element selected from the group consisting of:
  at least one rare earth element selected from the group consisting of Ce, Pr, Nd, Sm, Eu, Gd, Tb, Dy, Ho, Er, Tm, and Yb,
  at least one transition metal element selected from the group consisting of Ti, V, Cr, Mn, Fe, Co, Ni, Cu, Pd, Ir, and Pt, and
  at least one typical metal element selected from the group consisting of Zn, Cd, In, and Sn,
  and total amount thereof is 0 to 8 mol % in terms of oxides with respect to the mayenite-type compound.

[3] The electrolytic cell according to [1] or [2], wherein the solid electrolyte is a third mayenite-type compound;
the third mayenite-type compound is the mayenite-type compound having the representative composition represented by $12\ CaO \cdot 7Al_2O_3$;
the third mayenite-type compound is the same as or different from the first mayenite-type compound or the second mayenite-type compound.

[4] The electrolytic cell according to any one of [1] to [3], wherein the anode is the first mayenite-type compound or the second mayenite-type compound.

[5] The electrolytic cell according to any one of [1] to [4], wherein the electrolytic cell is for decomposing carbon dioxide.

[6] An electrolytic device comprising an electrolytic cell according to any one of [1] to [5].

[7] A method for decomposing carbon dioxide using the electrolytic device according to any one of [1] to [6].

Advantageous Effect of the Invention

According to the present invention, it is possible to provide an electrolytic cell or the like capable of simply electrolyzing carbon dioxide into carbon monoxide and oxygen with an activation energy lower than that of the conventional methods.

DETAILED DESCRIPTION OF THE INVENTION

DETAILED DESCRIPTION OF THE INVENTION

Figure 1:
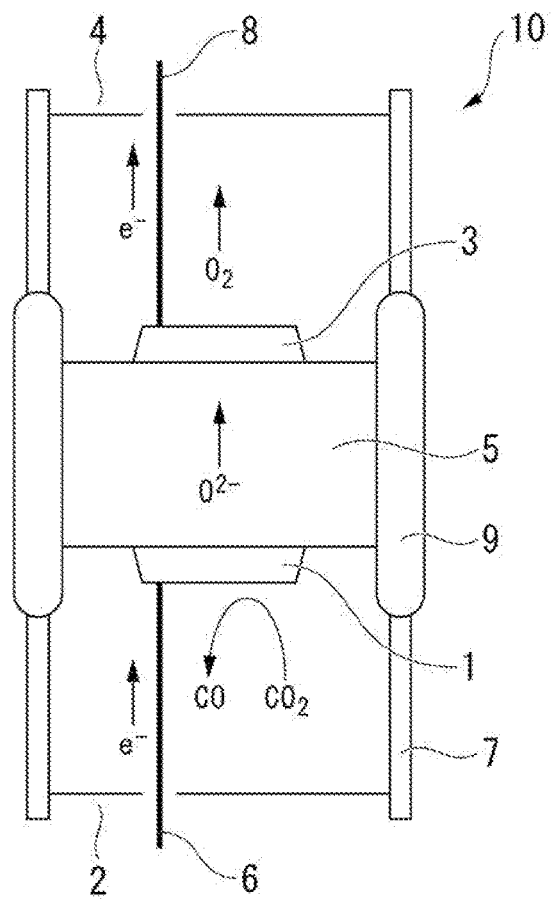
FIG. 1 is a schematic diagram showing a configuration of a carbon dioxide electrolytic cell according to an embodiment of the present invention.

The present invention will be described in detail below.
(Electrolytic Cell)

An electrolytic cell of a first embodiment of the present invention includes a cathode, an anode, and a solid electrolyte having oxide ion conductivity. The cathode contains a metal and a first mayenite type compound.

An electrolytic cell of a second embodiment of the present invention includes a cathode, an anode, and a solid electrolyte having oxide ion conductivity. The cathode contains a metal and a second mayenite type compound, and the second mayenite type compound contains a mayenite type compound having electron conductivity.

In the electrolytic cells of the first and second embodiments, each of the first mayenite-type compound and the second mayenite-type compound is a mayenite-type compound having a representative composition represented by $12CaO \cdot 7Al_2O_3$.

The first mayenite-type compound and the second mayenite-type compound may be the same or different.

The mayenite-type compound in the first embodiment and the second embodiment contains Al and at least one element selected from the group consisting of Ca and Sr, and a molar ratio of sum of CaO and SrO to $Al_2O_3$ in terms of oxide is 12.6:6.4 to 11.7:7.3.

The mayenite-type compound in the first embodiment and the second embodiment includes (i) to (iv), preferably.

(i) At least one element selected from the group consisting of B, Si and Ge, and total amount thereof is 0 to 17 mol % in terms of oxides with respect to the mayenite-type compound.

(ii) At least one element selected from the group consisting of Li, Na, and K, and total amount thereof is 0 to 5 mol % in terms of oxides with respect to the mayenite-type compound.

(iii) At least one element selected from the group consisting of Mg and Ba, and total amount thereof is 0 to 10 mol % in terms of oxides with respect to the mayenite-type compound.

(iv) At least one element selected from the group consisting of:
  at least one rare earth element selected from the group consisting of Ce, Pr, Nd, Sm, Eu, Gd, Tb, Dy, Ho, Er, Tm, and Yb,
  at least one transition metal element selected from the group consisting of Ti, V, Cr, Mn, Fe, Co, Ni, Cu, Pd, Ir, and Pt, and
  at least one typical metal element selected from the group consisting of Zn, Cd, In, and Sn,
  and total amount thereof is 0 to 8 mol % in terms of oxides with respect to the mayenite-type compound.

The solid electrolytes used in the electrolytic cells of the first and second embodiments is preferably a third mayenite-type compound. The third mayenite-type compound is the mayenite-type compound having the representative composition represented by $12CaO \cdot 7Al_2O_3$. The third mayenite-type compound may be the same as or different from the first mayenite-type compound used in the electrolytic cell of the first embodiment or the second mayenite-type compound used in the electrolytic cell of the second embodiment.

The anodes used in the electrolytic cell of the first embodiment and the second embodiment may be the first mayenite-type compound used in the electrolytic cell of the first embodiment or the second mayenite-type compound used in the electrolytic cell of the second embodiment.

Preferably, the electrolytic cells of the first and second embodiments are for decomposing carbon dioxide.

When the electrolytic cells of the first embodiment and the second embodiment are for decomposing carbon dioxide, the electrolytic cells may refer to a carbon dioxide ($CO_2$) electrolytic cell of the present invention. When the electrolytic cells of the first and second embodiments are for decomposing carbon dioxide, the cathodes of the electrolytic cells of the first and second embodiments may refer to an electrode for the carbon dioxide ($CO_2$) electrolytic cell of the first embodiment and an electrode for the carbon dioxide ($CO_2$) electrolytic cell of the second embodiment, respectively.

The electrodes for the carbon dioxide electrolytic cell of the first embodiment include a metal material and a first mayenite-type compound.

The first mayenite-type compound is a mayenite-type compound having a representative composition represented by $12CaO \cdot 7Al_2O_3$. The mayenite-type compound contains Al and at least one element selected from the group consisting of Ca and Sr, and a molar ratio of sum of CaO and SrO to $Al_2O_3$ in terms of oxides is 12.6:6.4 to 11.7:7.3. The mayenite-type compound preferably includes (i) to (iv).

(i) At least one element selected from the group consisting of B, Si and Ge, and total amount thereof is 0 to 17 mol % in terms of oxides with respect to the mayenite-type compound.

(ii) At least one element selected from the group consisting of Li, Na, and K, and total amount thereof is 0 to 5 mol % in terms of oxides with respect to the mayenite-type compound.

(iii) At least one element selected from the group consisting of Mg and Ba, and total amount thereof is 0 to 10 mol % in terms of oxides with respect to the mayenite-type compound.

(iv) At least one element selected from the group consisting of:
  at least one rare earth element selected from the group consisting of Ce, Pr, Nd, Sm, Eu, Gd, Tb, Dy, Ho, Er, Tm, and Yb,
  at least one transition metal element selected from the group consisting of Ti, V, Cr, Mn, Fe, Co, Ni, Cu, Pd, Ir, and Pt, and
  at least one typical metal element selected from the group consisting of Zn, Cd, In, and Sn,
  and total amount thereof is 0 to 8 mol % in terms of oxides with respect to the mayenite-type compound. Specifically, some of the atoms of Ca, Sr, and Al contained in the mayenite-type compound may be partially substituted by the atoms described in (i) to (iv) above.

Then, "electrode for electrolytic cell for decomposing carbon dioxide" may be simply called "electrode for $CO_2$ electrolytic cell" or "electrode for electrolytic cell".

In the electrode for the $CO_2$ electrolytic cell according to the first embodiment of the present invention, the first mayenite type compound can obtain electron conductivity by operation of the cell.

The electrode for the $CO_2$ electrolytic cell according to the second embodiment of the present invention includes a metal material and a second mayenite-type compound.

The electrode for the carbon dioxide electrolytic cell in the second mayenite type compound contains a mayenite type compound having electron conductivity.

The second mayenite-type compound is a mayenite-type compound having a representative composition represented by $12CaO \cdot 7Al_2O_3$ in the same manner as the first mayenite-type compound. The second mayenite-type compound may be the same mayenite-type compound as the first mayenite-type compound or a different mayenite-type compound.

In the electrode for the $CO_2$ electrolytic cell of the second embodiment, the second mayenite type compound can obtain electron conductivity by operation of the cell.

The carbon dioxide electrolytic cell includes a cathode for decomposing carbon dioxide, an anode, and a solid electrolyte. The cathode for decomposing carbon dioxide uses the electrode for the $CO_2$ electrolytic cell of the first embodiment or the second embodiment.

In one embodiment of the carbon dioxide electrolytic cell of the present invention, the solid electrolyte preferably contains a third mayenite-type compound.

The third mayenite type compound is a mayenite compound having a representative composition represented by $12CaO \cdot 7Al_2O_3$ in the same manner as the first mayenite type compound. The third mayenite-type compound may be the same mayenite-type compound as or a different mayenite-type compound from the first mayenite-type compound. The third mayenite-type compound may be the same mayenite-type compound as or a different mayenite-type compound from the second mayenite-type compound. The third mayenite-type compound is preferably a first mayenite-type compound because it has a high ability to mainly transport oxide ions, that is, is preferably the mayenite-type compound having the representative composition represented by $12CaO \cdot 7Al_2O_3$.

The electrode for $CO_2$ electrolytic cell of the first embodiment of the present invention contains the first mayenite-type compound, so that the first mayenite-type compound can chemically adsorb and dissociate carbon dioxide, and the activation energy at the time of carbon dioxide electrolysis is reduced. Further, in the electrode for the $CO_2$ electrolytic cell of the present embodiment, the first mayenite type compound can obtain the electron conductivity by the operation of the cell. Therefore, by using the first mayenite type compound which obtains the electron conductivity, the electron supply to the carbon dioxide molecule becomes easier, and as a result, the activation energy in the carbon dioxide electrolysis is further reduced.

Since the electrode for the $CO_2$ electrolytic cell of the second embodiment of the present invention contains the second mayenite type compound, the second mayenite type compound can chemically adsorb and dissociate carbon dioxide, and the activation energy at the time of carbon dioxide electrolysis is reduced. Further, in the electrode for the $CO_2$ electrolytic cell of the present embodiment, by using the second mayenite-type compound containing the mayenite-type compound having the electron conductivity, the electron supply to the carbon dioxide molecule becomes easier, and as a result, the activation energy at the time of the carbon dioxide electrolysis is further reduced.

In the prior art, when a defect transfer type oxide ion conductor such as a stabilized zirconia (YSZ) is usually used as an electrolyte, if an excessive oxide ion current is supplied, an irreversible blackening phenomenon occurs and mechanical strength of the material may be reduced. This is a serious drawback because the atmosphere must be isolated from electrolytes. In one embodiment of the carbon dioxide electrolytic cell of the present invention, when the third mayenite-type compound is used as the solid electrolyte, even if an excessive oxide ion current is supplied to the third mayenite-type compound, a C12A7 electride having the same crystal skeleton are obtained, so that mechanical strength does not decrease. The C12A7 electride can be reversibly returned to C12A7. Since the exchange of the solid electrolyte is not easy once the system is constructed, it is effective to use the third mayenite type compound as the solid electrolyte of the electrolytic cell in the carbon dioxide electrolytic cell.

Electrode for $CO_2$ Electrolytic Cell of First Embodiment

The electrode for the $CO_2$ electrolytic cell of the first embodiment will be described below.

In the electrode for the $CO_2$ electrolytic cell of the present embodiment, the first mayenite-type compound contains $12CaO \cdot 7Al_2O_3$ or $12Sr \cdot 7Al_2O_3$. Preferably, it contains $12CaO \cdot 7Al_2O_3$.

The "mayenite-type compound" is a compound having a crystal structure of the same type as that of calcium aluminosilicate (its mineral name is mayenite) containing CaO, $Al_2O_3$ and SiO as constituent components.

A preferred example of the first mayenite-type compound of this embodiment has a representative composition of $12CaO \cdot 7Al_2O_3$ (hereinafter referred to as "C12A7"), wherein the C12A7 crystal has a crystal structure in which two of the 66 oxide ions in a unit cell containing two molecules are enclosed as "free oxide ion" in a space in a cage formed by a crystal skeleton. For example, it is a compound described as $[Ca_{24}Al_{28}O_{64}]^{4+}(O^{2-})_2$ (hereinafter referred to as "C12A7:$O^{2-}$") in the chemical formula.

The first mayenite-type compound of the present embodiment also includes, for example, a compound in which the free oxide ion of C12A7:$O^{2-}$ is replaced with various anions (for example, C12A7:X (X=$O^{2-}$,$H^-$,$e^-$, etc.)). For example, the free oxide ion of $O^{2-}$ is substituted with $H^-$ to give a compound described as $[Ca_{24}Al_{28}O_{64}]^{4+}(H^-)_4$ in a chemical formula (hereinafter referred to as "C12A7:$H^-$").

Particularly, when the mayenite-type compound is held in a strong reducing atmosphere, free oxide ions is replaced with electrons, and thus, a conductive mayenite-type compound described as $[Ca_{24}Al_{28}O_{64}]^{4+}(e^-)_4$ in a chemical formula (hereinafter referred to as "C12A7:$e^-$") is obtained and the conductive mayenite-type compound exhibits good electron conduction characteristics.

As the first mayenite type compound of the present embodiment, $12SrO \cdot 7Al_2O_3$ which is the same type compound as C12A7 or a mixed crystal compound of C12A7 and $12SrO \cdot 7Al_2O_3$ can be used. Further, according to the operation of the $CO_2$ electrolytic cell of the present embodiment, the first mayenite type compound constituting the electrode for the $CO_2$ electrolytic cell can obtain electron conductivity. From the operation of the $CO_2$ electrolytic cell, the conductivity of the first mayenite-type compound after obtaining electronic conductivity can be evaluated by the method of hard X-ray XPS described later.

The electrode for the $CO_2$ electrolytic cell of the present embodiment further includes a metal. The term "metal" as used in the present invention means a substance exhibiting metallic properties, such as a simple substance of a metallic element, an alloy composed of another metallic element and/or a metalloid element, a solid solution, or an intermetallic compound.

Examples of the metals of the present invention include titanium (Ti), vanadium (V), chromium (Cr), manganese (Mn), iron (Fe), cobalt (Co), nickel (Ni), copper (Cu), ruthenium (Ru), rhodium (Rh), palladium (Pd), osmium (Os), iridium (Ir), platinum (Pt), gold (Au), and silver (Ag). Among them, single substances of Co, Ni, Cu, Ag, W and Pt; or alloys thereof are preferable in that those metals can exhibit higher electrical conductivity in a high-temperature environment. Further, a high melting point metal of 900° C. or higher, such as nickel or platinum, is more preferable.

For example, a metal having a high melting point of 900° C. or higher, such as nickel and platinum, may be used. Nickel or platinum is preferred.

The amount of the metal contained in the electrode for the $CO_2$ electrolytic cell of the present embodiment is preferably from 20 volume % to 80 volume %, and more preferably from 25 volume % to 75 volume %, with respect to the volume of the entire electrode. For example, the volume ratio (M/C) of the metal (M) to the first mayenite type compound (C) is preferably 3:1 to 1:3, more preferably 2:1 to 2:3.

The thickness of the electrode for the $CO_2$ electrolytic cell of the present embodiment is not particularly limited, but is preferably 10 μm to 1 mm, more preferably 100 μm to 0.5 mm.

Further, the shape of the electrode of the present embodiment is not particularly limited as long as the effect of the present invention is achieved, and various known shapes such as a columnar shape or a flat plate shape may be used. A porous body shape may also be used. In this case, the pore diameter of the porous body is preferably about 0.01 to 0.5 μm.

<<Method of Manufacturing Electrode for $CO_2$ Electrolytic Cell>>

The method of manufacturing the electrode for the $CO_2$ electrolytic cell of the present embodiment is not particularly limited as long as the electrode satisfying the configuration of the electrolytic cell of the present invention is obtained. The method includes a mixing step of mixing the first mayenite-type compound with a metal, and a sintering step of sintering the obtained mixture. Alternatively, the method of manufacturing the electrode for the $CO_2$ electrolytic cell of the present embodiment includes a mixing step of mixing the first mayenite-type compound with a metal oxide, and a reduction sintering step of reducing and sintering the obtained mixture.

In the mixing step, a conventionally known method of mixing the first mayenite-type compound with a metal or metal oxide can be used. For example, the powder of the first mayenite type compound and the powder of a metal or a metal oxide can be mixed and stirred to form, for example, a paste, by using a dispersion such as polyethylene glycol or the like.

The method may further include a step of applying the obtained paste-like mixture to a predetermined shape, drying it, or calcining it temporarily before the sintering step or the reduction sintering step.

In the sintering step, the mixture obtained by the mixing method can be sintered using, for example, the following conditions.

Sintering temperature: usually 900° C. or higher, preferably 1000° C. or higher, usually 1500° C. or lower, preferably 1300° C. or lower Atmosphere: $N_2$ or atmosphere Sintering time: usually from 1 hour to 20 hours, preferably from 1 hour to 10 hours In the reduction/sintering step, the mixture obtained by the mixing method can be reduced/sintered using, for example, the following conditions. The reduction treatment may be performed before or after the electrode is mounted to the electrolytic cell. From the viewpoint that the gas control unit of the electrolytic device can be used, it is preferable to perform it after mounting.

Sintering temperature: usually 900° C. or higher, preferably 1000° C. or higher, usually 1500° C. or lower, preferably 1300° C. or lower Atmosphere: $N_2$ or atmosphere Sintering time: 1 hour to 20 hours, preferably 1 hour to 10 hours Reduction temperature: usually not less than 700° C., preferably not less than 800° C., usually not more than 1200° C., preferably not more than 1100° C.

Reducing atmosphere: $H_2$ and $N_2$

Reduction time: 1 hour to 20 hours, preferably 1 hour to 10 hours

For example, the electrode for the $CO_2$ electrolytic cell of the present embodiment can be manufactured in a predetermined thickness, and then a solid electrolyte described later can be applied thereon and sintered. Alternatively, a mixture of the first mayenite type compound and a metal or metal oxide may be applied on a solid electrolyte described later and then sintered. Alternatively, the electrodes and the solid electrolyte may be individually sintered in a predetermined shape, and then the electrodes and the solid electrolyte may be bonded and finally sintered.

Electrode for $CO_2$ Electrolytic Cell of Second Embodiment

The electrode for the $CO_2$ electrolytic cell of the second embodiment will be described below.

<Electrode for $CO_2$ Electrolytic Cell>

In the electrode for the $CO_2$ electrolytic cell of the present embodiment, the second mayenite-type compound contains $12CaO \cdot 7Al_2O_3$ or $12SrO \cdot 7Al_2O_3$. Preferably, it contains $12CaO \cdot 7Al_2O_3$.

A preferred example of the second mayenite-type compound according to the present embodiment is structurally similar to the first mayenite-type compound of the first embodiment.

However, in the electrode for $CO_2$ electrolytic cell of the present embodiment, the second mayenite type compound contains a mayenite type compound having electron conductivity, which is different from the electrode for $CO_2$ electrolytic cell of the first embodiment.

The second mayenite-type compound of the present embodiment preferably includes a conductive mayenite-type compound such as $C12A7:e^-$.

The conductivity of the second mayenite-type compound of the present embodiment can be evaluated by the method of hard X-ray XPS described later.

<<Method of Manufacturing Electrode for $CO_2$ Electrolytic Cell>>

The method of manufacturing the electrode for the $CO_2$ electrolytic cell of this embodiment includes the mixing step, and the sintering step or the reduction/sintering step of the method of manufacturing the electrode for the $CO_2$ electrolytic cell of the first embodiment. The method further includes a step of forming a mayenite type compound having electron conductivity in the second mayenite type compound included in the electrode for the $CO_2$ electrolytic cell. Hereinafter, only this step will be described.

In the second mayenite type compound, if a mayenite type compound having electronic conductivity can be formed, the method is not particularly limited. For example, the electrode for the $CO_2$ electrolytic cell of this embodiment having a predetermined shape is formed by a method similar to the method for manufacturing the electrode for the $CO_2$ electrolytic cell of the first embodiment, and then the electrode is attached to an electrolytic device including a power supply unit by a method for manufacturing an electrolytic cell 10 (for example, FIG. 1) and an electrolytic device 100 (FIG. 2) described later. While introducing carbon dioxide gas into the electrode for the $CO_2$ electrolytic cell, a voltage is applied to operate the electrolytic cell. As a result, the second mayenite-type compound can contain a mayenite-type compound having electronic conductivity. The voltage, processing time and processing temperature for operating the electrolytic cell are not particularly limited, and for example, the same conditions as those for evaluating the voltage-current characteristics of the electrolytic cell can be used.

An examples of another method in which the second mayenite-type compound obtains electronic conductivity includes a method of obtaining the second mayenite-type compound having electronic conductivity by applying a voltage only to the electrodes for the $CO_2$ electrolytic cell before attaching to the electrolytic cell.

In addition, another example of a method for forming the mayenite-type compound having the electronic conductivity in the second mayenite-type compound includes a method of changing the mayenite-type compound into a conductive mayenite-type compound represented by formula $[Ca_{24}Al_{28}O_{64}]^{4+}(e^-)_4$ (hereinafter referred to as "C12A7:e$^-$") by holding the mayenite-type compound in a strong reducing atmosphere and replacing at least a part of free oxide ions in the mayenite-type compound by electrons.

($CO_2$ Electrolytic Cell)

As shown in FIG. 1, a $CO_2$ electrolytic cell 10 according to an embodiment of the present invention includes a $CO_2$ decomposition side electrode 1 (cathode, electrode for $CO_2$ electrolytic cell), an $O_2$ discharge side electrode (anode) 3, and a solid electrolyte 5. The $CO_2$ electrolytic cell 10 according to one embodiment of the present invention preferably further includes a $CO_2$ inlet port 2, an $O_2$ outlet port 4, a power supply connection unit 6 of the $CO_2$ decomposition side electrode, a ceramic tube 7, a power supply connection unit 8 of the $O_2$ discharge side electrode, and a glass seal 9. Although not shown, the $CO_2$ electrolytic cell 10 according to one embodiment of the present invention may have a mechanism for heating the entire electrolytic cell 10.

<Cathode>

As the cathode for decomposing carbon dioxide, the electrode for the $CO_2$ electrolytic cell of the first embodiment or the electrode for the $CO_2$ electrolytic cell of the second embodiment can be used.

<Anode>

The anode used in the $CO_2$ electrolytic cell of the present embodiment is not particularly limited, and it is possible to use an electrode different from or the same as the electrode for the $CO_2$ electrolytic cell. Examples of the electrodes different from the electrode for the $CO_2$ electrolytic cell include $La_{0.8}Sr_{0.2}MnO_3$ (hereinafter referred to as LaSrMnO).

<Solid Electrolyte>

The solid electrolyte used in the $CO_2$ electrolytic cell of the present embodiment is not particularly limited, but any solid electrolyte that can flow oxide ions can be used. A rare earth doped cerium oxide, YSZ, the third mayenite type compound, and the like are usually used. Of these, YSZ and the third mayenite-type compound are preferable in terms of mechanical strength and ease of sintering and molding. And, the third mayenite-type compound is more preferable in terms of having the same or similar composition and crystal structure as the electrode material and the same oxide ion conduction mechanism as the electrode material.

The third mayenite-type compound may be the same as or different from the first mayenite-type compound or the second mayenite-type compound constituting the electrodes for the $CO_2$ electrolytic cells of the present embodiments.

<<Method for Manufacturing Solid Electrolyte>>

The method of manufacturing a solid electrolyte used in the $CO_2$ electrolytic cell of the present embodiment includes a step of sintering a third mayenite-type compound as a raw material.

In the sintering step, for example, the powder of the third mayenite type compound can be hot-pressed. For example, sintering can be performed using the following conditions.

Sintering temperature: usually not less than 1000° C., preferably not less than 1100° C. and not more than 1600° C., and preferably not more than 1500° C.

Atmosphere: $N_2$

Sintering time: 0.5 to 10 hours, preferably 0.5 to 8 hours (Method for Manufacturing Electrolytic Cell)

The $CO_2$ electrolytic cell shown in FIG. 1 can be manufactured by combining the electrode for the $CO_2$ electrolytic cell of this embodiment as a cathode with a solid electrolyte and an anode. Pyrex (registered trade mark) glass was used as the sealing material.

Examples of the $CO_2$ electrolytic cell of the present embodiment include the following combinations.

(I) $CO_2$ Electrolytic Cell
Cathode: Pt/C12A7 (electrode for $CO_2$ electrolytic cell of first embodiment or electrode for $CO_2$ electrolytic cell of second embodiment)
Solid electrolyte: C12A7
Anode: Pt/C12A7, Pt/YSZ, or LaSrMnO (II) $CO_2$ Electrolytic Cell
Cathode: Pt/C12A7 (electrode for $CO_2$ electrolytic cell of first embodiment or electrode for $CO_2$ electrolytic cell of second embodiment)
Solid Electrolyte: YSZ
Anode: Pt/C12A7, Pt/YSZ or LaSrMnO (III) $CO_2$ Electrolytic Cell
Cathode: Pt/YSZ (electrode for $CO_2$ electrolytic cell of first embodiment or electrode for $CO_2$ electrolytic cell of second embodiment)
Solid electrolyte: C12A7
Anode: Pt/C12A7, Pt/YSZ, or LaSrMnO (IV) $CO_2$ Electrolytic Cell
Cathode: Ni/C12A7 (electrode for $CO_2$ electrolytic cell of first embodiment or $CO_2$ electrolytic cell of second embodiment)

Solid electrolyte: C12A7
Anode: Ni/C12A7, Ni/YSZ, or LaSrMnO (V) $CO_2$ Electrolytic Cell
Cathode: Ni/C12A7 (electrode for $CO_2$ electrolytic cell of first embodiment or electrode for $CO_2$ electrolytic cell of second embodiment)
Solid Electrolyte: YSZ
Anode: Ni/C12A7, Ni/YSZ or LaSrMnO (VI) $CO_2$ Electrolytic Cell
Cathode: Ni/YSZ (electrode for $CO_2$ electrolytic cell of first embodiment or electrode for $CO_2$ electrolytic cell of second embodiment)
Solid electrolyte: C12A7
Anode: Ni/C12A7, Pt/YSZ, or LaSrMnO (Electrolytic device)

Figure 2:
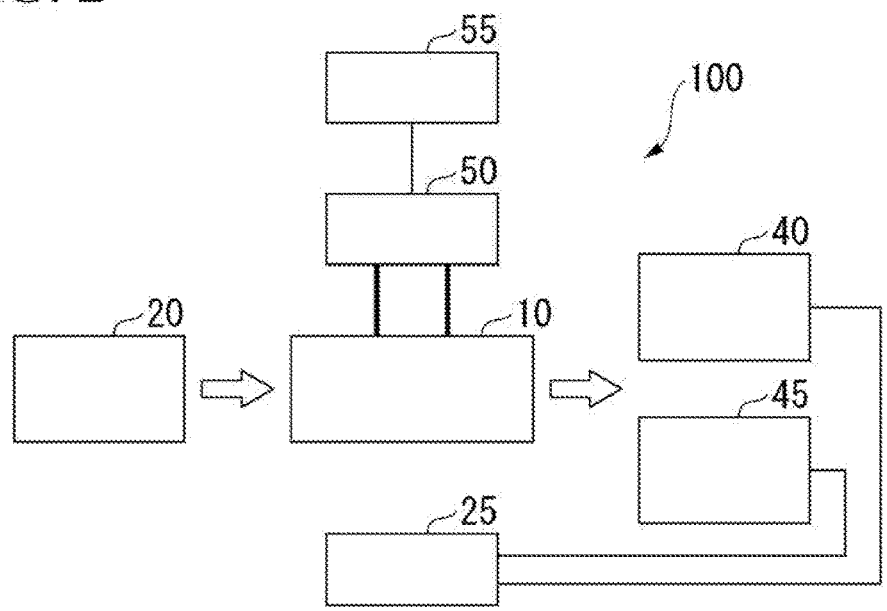
FIG. 2 is a schematic diagram showing the configuration of an electrolytic device comprising a carbon dioxide electrolytic cell according to an embodiment of the present invention.

As shown in FIG. 2, an electrolytic device 100 according to one embodiment of the present invention includes a $CO_2$ electrolytic cell 10, a $CO_2$ gas supply unit 20, a gas analysis unit 25, an $O_2$ gas discharge unit 40, a $CO_2$ reduction gas discharge unit 45, a power supply unit 50, and an electric measurement unit 55. The $CO_2$ electrolytic cell 10 has a $CO_2$ electrolytic cell including the electrode for the $CO_2$ electrolytic cell of the first embodiment or the electrode for the $CO_2$ electrolytic cell of the second embodiment.

(Decomposition of Carbon Dioxide)

The method of decomposing carbon dioxide ($CO_2$ electrolysis) using the electrolytic cell and the electrolytic device can be performed by introducing $CO_2$ into the electrolytic cell of the present invention and applying a voltage between the cathode and the anode.

More specifically, according to the embodiment shown in FIG. 1, $CO_2$ is introduced into the $CO_2$ electrolytic cell 10 through the $CO_2$ inlet port 2. The $CO_2$ introduced at this time may contain a component other than $CO_2$ within a range not inhibiting electrolysis. Specifically, it may contain air, nitrogen, oxygen or water vapor, or may be diluted with various carrier gases. Although not shown, in the electrolytic cell into which $CO_2$ is introduced, the electrolytic cell is usually heated by a mechanism for heating the entire electrolytic cell 10. The temperature at the time of electrolysis is not particularly limited, and can be appropriately adjusted, but the temperature is usually 400° C. or higher, 1000° C. or lower, and preferably 900° C. or lower. By adjusting the temperature within the above range, sufficient $CO_2$ electrolysis can be performed and the required voltage can be reduced, which is advantageous in terms of energy.

$CO_2$ can be decomposed by applying a voltage to the electrolytic cell while heating the electrolytic cell. The voltage applied at this time is not particularly limited and can be adjusted appropriately, but the voltage is usually 0.5 V or more, preferably 0.9 V or more, and the higher the voltage, the more advantageous for $CO_2$ decomposition, and the voltage is usually 2.0 V or less, preferably 1.5 V or less, and more preferably 1.3 V or less.

The electron-conductive mayenite-type compound in the second mayenite-type compound contained in the cathode adsorbs $CO_2$ and dissociates $CO_2$ into CO and oxide ions. By applying a voltage to the electrolytic cell, the oxide ions are rapidly moved to the anode side through the solid electrolyte 5 of the electrolytic cell and are converted into oxygen at the anode. And then, the oxygen is discharged to the outside of the electrolytic cell from the $O_2$ discharge port 4. The CO adsorbed on the cathode side is desorbed from the cathode and discharged from a CO discharge port (not shown). At this time, the second mayenite type compound having electron conductivity contained in the cathode is oxidized when $CO_2$ is dissociated and adsorbed, and the second mayenite type compound is converted into a mayenite type compound without electron conductivity, but the mayenite type compound having electron conductivity is regenerated by continuously applying a voltage, and can be continuously used for electrolysis of $CO_2$.

EXAMPLES

The present invention will be described below with reference to more detailed examples, but the present invention is not limited to these examples.

<Manufacture of Electrodes for $CO_2$ Electrolytic Cells>
<<Pt/C12A7 Electrode>>

12 CaO $7Al_2O_3$ (C12A7) powder (manufactured by High Purity Chemical Co., Ltd.) and platinum powder (made by Tanaka Kikinzoku Kogyo) as metals were mixed with polyethylene glycol 600 (manufactured by Wako Pure Chemical Industries, Ltd.) to obtain a paste-like mixture.

In the mixture, the mixing ratio of the C12A7 powder to the platinum powder was 1:1 in volume ratio, and the mixture was mixed at a ratio of polyethylene glycol 10 µL to 50 mg of the mixed powder. The mixture was then applied to an electrolyte material to be used in a cylindrical shape having a radius of 3.0 mm and a thickness of about 30 to 50 µm, and sintered the obtained electrolyte material under the following conditions. "Pt/C12A7 electrode" (hereinafter referred to as Electrode A) was formed on the surface of the electrolyte material by the above steps.

Electrode sintering temperature: 1150° C.
Electrode sintering time: 5 hours

<<Ni/C12A7 Electrode>>

In the manufacture of the Electrode A, the mixed powder was sintered onto the electrolyte material to be used by using the same method except that the platinum powder was changed to nickel oxide (II) (made by Kanto Chemical Co., Ltd.). After being attached to the electrolytic device, nickel oxide was reduced to metallic nickel by exposing the nickel oxide to mixed gases having a flow rate of nitrogen to hydrogen of 90 sccm to 10 sccm, 50 sccm to 50 sccm, and 0 sccm to 100 sccm, respectively, in this order for 1 hour at 900° C. As a result, "Ni/C12A7 electrode" (hereinafter referred to as Electrode B) was formed on the surface of the electrolyte material.

<Production of Solid Electrolyte>
<<Production of C12A7 Electrolyte>>

The C12A7 electrolyte was obtained by hot-pressing a C12A7 powder under the following conditions. The C12A7 electrolyte has a cylindrical shape with a radius of 10 mm and a thickness of 0.5 mm.

C12A7 Electrolyte Sintering Temperature: 1300° C.
Sintering temperature of C12A7 electrolyte: 1 hour <<Preparation of YSZ Electrolyte>>

As the YSZ electrolyte, a commercially available YSZ sintered compact (Made by Tosoh Corporation) was used. The shape of the YSZ electrolyte is a cylinder with a radius of 10 mm and a thickness of 0.5 mm.

<<LaSrMnO Electrode>>

LaSrMnO powder (made by Sigma Aldrich) was mixed with polyethylene glycol 600 to form a paste-like mixture. The mixture was mixed in a ratio of 50 mg of LaSrMnO powder to 10 µL of polyethylene glycol.

Hereinafter, in the same manner as Electrode A, after the obtained paste-like mixture was applied to the electrolyte material to be used, and then "LaSrMnO electrode" (hereinafter referred to as electrode C) was formed on the surface of the electrolyte material by sintering the obtained electrolyte material.

<CO$_2$ Electrolytic Cell>

The CO$_2$ electrolytic cell shown in FIG. 1 was manufactured by combining the obtained electrode for the CO$_2$ electrolytic cell as a cathode with the obtained C12A7 electrolyte and anode.

Example 1

On the surface of the C12A7 electrolyte, the Electrode A was formed as a cathode and an anode, and the electrolytic cell shown in FIG. 1 was manufactured.

Example 2

In the electrolytic cell according to Example 1, the electrolytic cell shown in FIG. 1 was manufactured by the same combination except that the electrolyte was changed to the YSZ electrolyte.

Details of each unit are shown in Table 1. Pyrex (registered trade mark) glass was used as a sealing material.

<Evaluation of CO$_2$ Electrolytic Cell>

For control and measurement of introduction of CO$_2$ gas and discharge of O$_2$ gas, an electrolytic device 100, in which gas analysis became possible by adding a gas analysis unit 25 into BEL-SOFC (MicrotracBEL) as a base device, was used. FIG. 2 is a schematic diagram showing the configuration of the electrolytic device 100.

A gas analyzer: M-401QA-M (Canon ANELVA Inc.) was used as the gas analyzer 25. The absolute amount of CO produced by the decomposition of CO$_2$ was obtained by flowing argon containing 10% CO as a standard gas into the device and preparing a calibration curve.

An HZ-5000 (Hokuto Denko Corporation) was used as the power supply unit 50 and the electric measurement unit 55.

(Evaluation Method of Electrolytic Cell)

<Evaluation of Voltage-Current Characteristics of Electrolytic Cells>

The voltage-current characteristics of the electrolytic cell 10 (FIG. 1) of the present embodiment are evaluated by the electrolytic device 100 shown in FIG. 2.

Power: HZ-5000 (Hokuto Denko Corporation)

Figure 3:
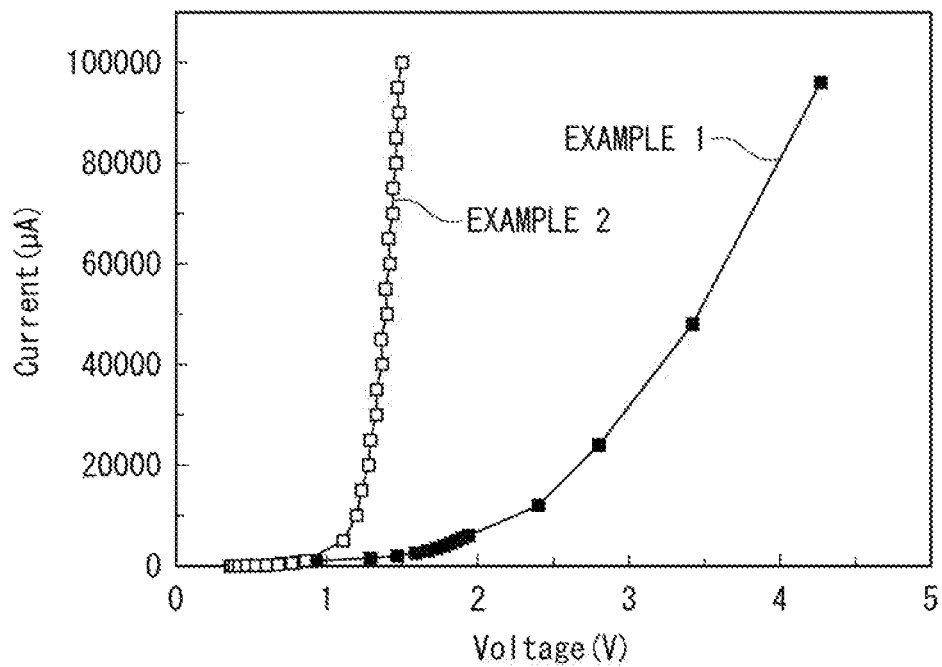
FIG. 3 shows dependence between voltage and exchange current of the carbon dioxide electrolytic cell of the present invention.

Electrolytic cells using Pt/C12A7 as a cathode and anode, and using C12A7 (Example 1) and YSZ (Example 2) as electrolytes were held at 900° C., and while a mixed gas of argon of 8 sccm and carbon dioxide gas of 2 sccm was supplied, HZ-5000 was changed in a constant current mode in the range of 1 μA-100 mA and held at each current value for 3 minutes, and then the voltage value was measured for each current value. The voltage-current characteristics are shown in FIG. 3. On the other hand, the amounts of generated CO and the flowing currents were in one-to-one correspondence, and conversion efficiency was about 100%.

<Evaluation of Temperature Dependence>

Figure 4:
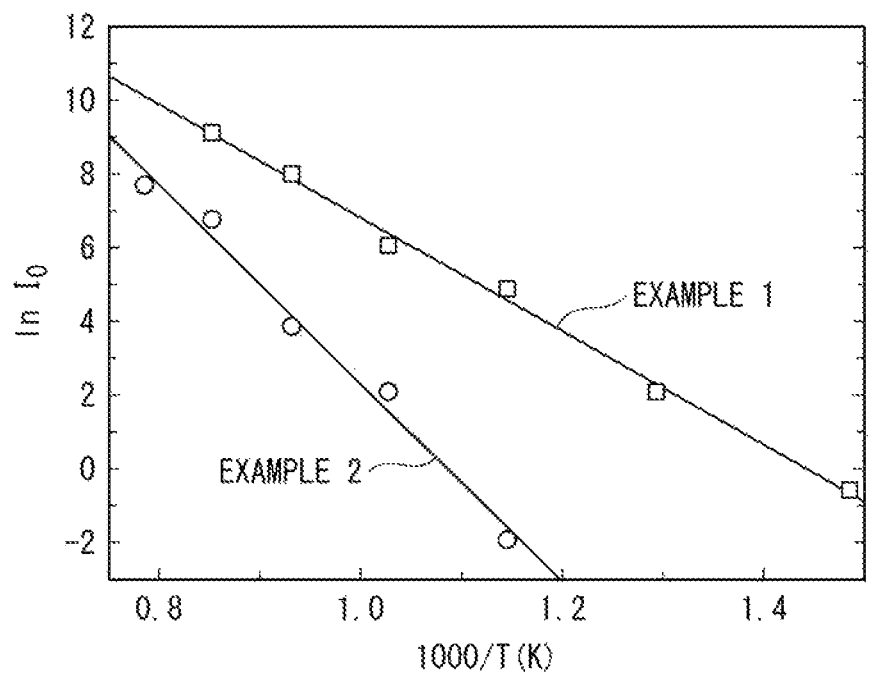
FIG. 4 shows temperature dependence of current in the carbon dioxide electrolytic cell of the present invention.
Figure 5:
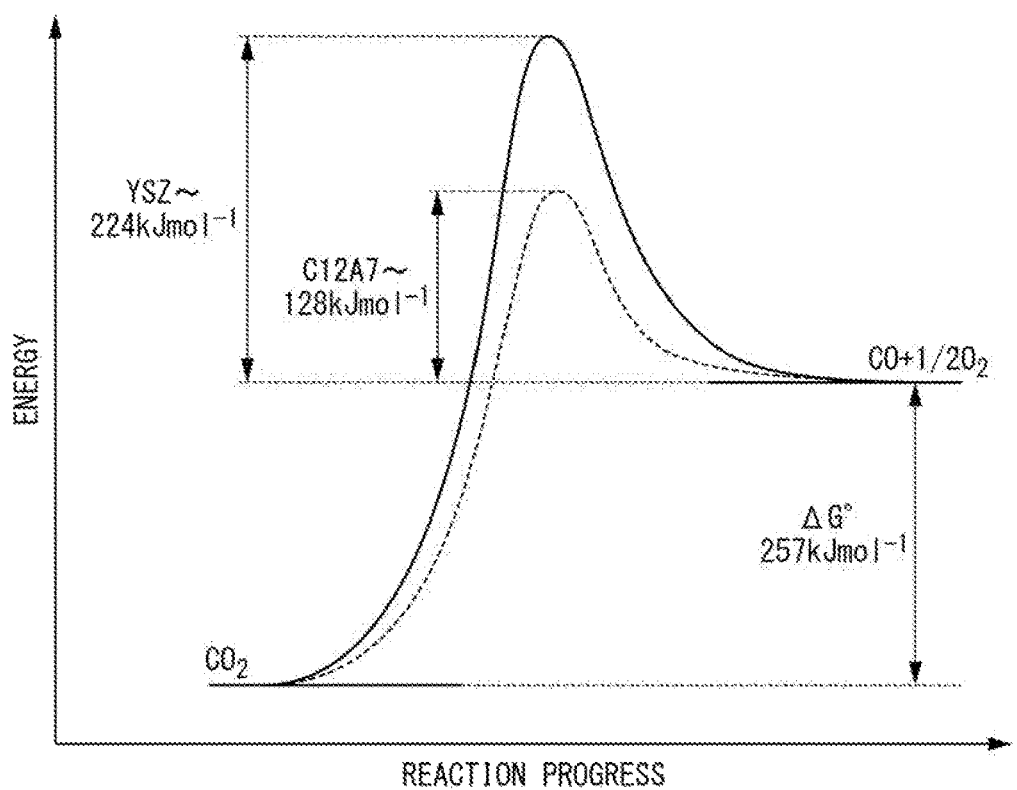
FIG. 5 shows activation energies of carbon dioxide decomposition reactions of the carbon dioxide electrolytic cell.
Figure 6:
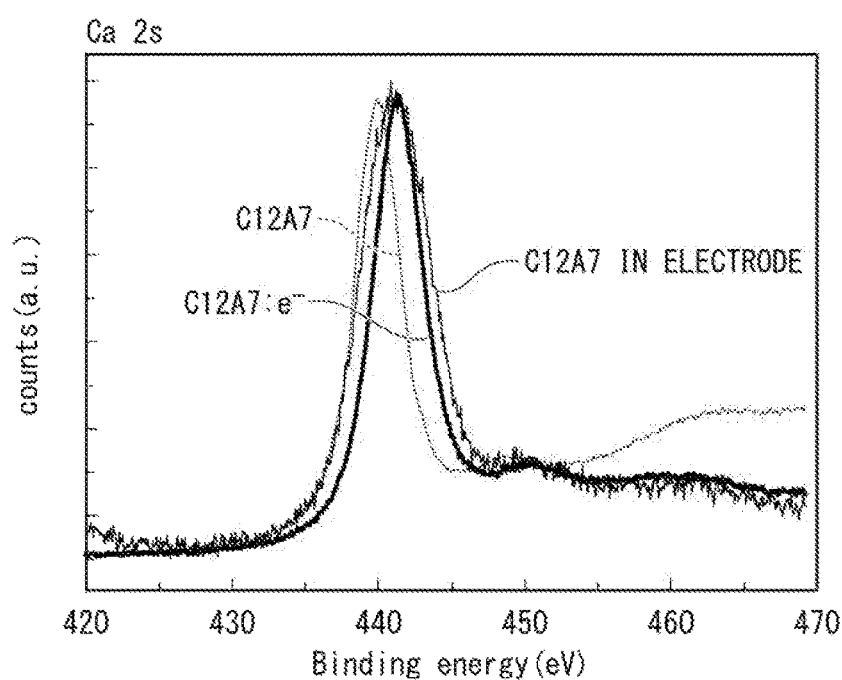
FIG. 6 is an XPS spectrum of C12A7 of the electrode portion before and after electrochemical characterization in Example 1.

The above-mentioned evaluations of voltage-current characteristics of the electrolytic cell were performed at intervals of 100° C. in the range of 400° C. to 900° C. The difference between the theoretical electrolysis voltage of CO$_2$ and the voltage obtained by the measurement at each temperature was defined as the overvoltage η, and the exchange current (I$_0$) was measured from the intercept of the plot (Tafel plot) with the logarithm of the current value. The result of I$_0$ at each temperature is shown in FIG. 4. From the slope of the plot, the activation energy required for the reaction was estimated, and the activation energy for each electrolyte was obtained, as shown in FIG. 5. C12A7:128 kJmol$^{-1}$; YSZ:224 kJmol$^{-1}$.

<Evaluation of Electronic Conductivity>

After evaluating the voltage-current characteristics, the CO$_2$ decomposition electrode for the CO$_2$ electrolytic cell after the experiment was measured by hard X-ray XPS (analyzer: Scienta Omicron R4000, light source: Synchrotron Radiation (6 keV, SPring-8·BL15XU)), and the results are shown in FIG. 5. For comparison, results for C12A7 single crystal and C12A7:e$^-$ single crystal are also shown. "C12A7" in FIG. 5 is a measurement result of a C12A7 single crystal sample prepared from a C12A7 raw material powder made by High Purity Chemical Co., Ltd. by a known method described in, for example, Non-Patent Document 1 (Crystal Growth & Design vol. 8 No. 4, 1271-1275 (2008)). "C12A7:e$^-$" in FIG. 5 is a measurement result of a C12A7:e$^-$ single crystal sample prepared from a C12A7 raw material powder made by High Purity Chemical Co., Ltd. by a known method described in, for example, Non-Patent Document 2 (Nano Letters vol. 7 No. 5, 1138-1143 (2007)). Since the conductive C12A7 has a different Fermi level, the presence of the conductive C12A7 can be confirmed by measuring the binding energy of the constituent elements of the C12A7. As a result, it was suggested that a part of C12A7 contained in the electrode changed to C12A7:e$^-$. The results are given as "A" and shown in Table 1.

<Current at 1.2 V>

Table 1 shows the current values at a sample temperature of 900° C. and a voltage of 1.2 V in the same manner as the evaluation of the voltage-current characteristics of the electrolytic cell.

<Relative Amount of CO$_2$ Decomposition>

The obtained current value was set to 1.0 as the relative decomposition amount of CO$_2$, and the values obtained by dividing the current values of Examples 2 to 6 and Comparative Example 1 described later by the current values of Example 1 were set as the relative decomposition amounts. The results are shown in Table 1.

Example 3

An electrolytic cell according to Example 1 was manufactured by the same method except that the cathode was changed to the Electrode B and the anode was changed to the Electrode C. The performance of the electrolytic cell was evaluated in the same manner as in Example 1. The results are shown in Table 1.

Example 4

An electrolytic cell was manufactured in the same manner as in Example 3 except that the electrolyte of the electrolytic cell in Example 3 was changed to an YSZ electrolyte, and its performance was evaluated. The results are shown in Table 1.

<<Pt/YSZ Electrode>>

A Pt/YSZ electrode (hereinafter referred to as Electrode D) was formed on the electrolyte material to be used by the same method as the method for forming the Electrode A except that the powder of C12A7 was changed to YSZ powder (made by Sigma Aldrich).

<<Ni/YSZ Electrode>>

A Ni/YSZ electrode (hereinafter referred to as Electrode E) was formed on the electrolyte material to be used by the same method as the method for forming the Electrode B except that the powder of C12A7 was changed to the powder of YSZ.

Comparative Example 1

An electrolytic cell was obtained by the same method as in Example 1, except that the Electrode D was used for a cathode and an anode. The electrolytic cell was evaluated under the same conditions as in Example 1.

Comparative Example 2

An electrolytic cell was obtained by the same method as in Example 1 except that the Electrode E was used as a cathode and the Electrode C was used as an anode. The electrolytic cell was evaluated under the same conditions as in Example 2.

The voltage values at 10 mA and 3 mA were evaluated for a cell made of Pt and a cell made of Ni, respectively. The results are shown in Table 1.

Example 5

An electrolytic cell was manufactured by using the YSZ electrolyte, using the Electrode C as an anode, and using a cathode which was formed by the same method as that of the Electrode A except that a mass ratio of a mixture of a C12A7 powder to a platinum powder was changed to 2:1.

The current value and the relative $CO_2$ decomposition amount at 1.2 V were measured and evaluated in the same manner as in Example 1. The results are shown in Table 1.

Example 6

An electrolytic cell was manufactured by the same method as Example 5 except that a mixture in which the mass ratio of the C12A7 powder to the platinum powder in the mixture used for the electrode A at the time of cathode formation was changed to 2:3 was used. The electrolytic cell was evaluated in the same manner as in Example 1. The results are shown in Table 1.

Comparison and Evaluation of Examples and Comparative Examples

When Example 1 is compared with Example 2, it can be confirmed that the current value ($CO_2$ decomposition volume) at the same voltage increases when C12A7 was mixed into the cathode. Further, it can be confirmed that the cell operates even using a metal other than Pt according to Examples 1 to 4 and Comparative Example 1, and it can be confirmed that if the ceramics mixed in the cathode are the same as the chemical species of electrolytes, the voltage required to obtain the same amount of current decreases. When Ni was used in the cathodes, the performance of the cell using C12A7 as the electrolyte is remarkably lower than that of the cell using YSZ as the electrolyte, and the reason is considered to be due to the high-temperature hydrogen treatment which was necessary for the reduction of nickel oxide (II). When C12A7 is exposed to hydrogen at a high temperature, the oxide ion conductivity is remarkably lowered by replacing the internal oxide ion with hydrogen.

From the comparison between Examples 5 and 6, it can be confirmed that the ratio of the ceramic material to the metal material mixed in the electrode is an important factor for lowering the voltage required to obtain the same amount of current. The metallic material mixed in the electrode plays a role of a current collector, and if the amount of the metallic material becomes smaller than that of the ceramic material, it is considered that electrical contact with the cell decreases.

TABLE 1

| | Cathode ($CO_2$ decomposition side electrode) | | | | Anode | | Decomposition reaction conditions | | Evaluation of electrolytic cell | |
|---|---|---|---|---|---|---|---|---|---|---|
| | Ceramic material C | Metal material M | M/C | Electron conductivity | (oxygen discharge side electrode) | Solid electrolyte | Temperature (° C.) | Voltage (V) | Current (mA) | Relative amount of $CO_2$ decomposition |
| Example 1 | C12A7 | Pt | 1:1 | A | Pt + C12A7 | C12A7 | 900 | 1.2 | 10 | 1.0 |
| Example 2 | C12A7 | Pt | 1:1 | A | Pt + C12A7 | YSZ | 900 | 1.2 | 1.5 | 0.15 |
| Example 3 | C12A7 | Ni | 1:1 | — | LaSrMnO | C12A7 | 900 | 1.2 | 3.0 | 0.3 |
| Example 4 | C12A7 | Ni | 1:1 | — | LaSrMnO | YSZ | 900 | 1.2 | 0.6 | 0.06 |
| Comparative Example 1 | YSZ | Pt | 1:1 | — | Pt + YSZ | YSZ | 900 | 3.7 | 10 | 1.0 |
| Comparative Example 2 | YSZ | Ni | 1:1 | — | LaSrMnO | YSZ | 900 | 2.0 | 3 | 0.3 |
| Example 5 | C12A7 | Pt | 2:1 | A | LaSrMnO | YSZ | 900 | 1.2 | 13 | 1.3 |
| Example 6 | C12A7 | Pt | 2:3 | A | LaSrMnO | YSZ | 900 | 1.2 | 2.6 | 0.26 |

DESCRIPTION OF THE SIGN IN DRAWING

1 . . . $CO_2$ decomposition side electrode (cathode; electrode for $CO_2$ electrolytic cell)
2 . . . $CO_2$ inlet port
3 . . . $O_2$ discharge side electrode (anode)
4 . . . $O_2$ Outlet port
5 . . . Solid electrolyte
6 . . . Power supply connection unit of $CO_2$ decomposition side electrode
7 . . . Ceramic tube
8 . . . Power supply connection unit of $O_2$ discharge side electrode
9 . . . Glass seal
10 . . . $CO_2$ electrolytic cell
20 . . . $CO_2$ gas supply unit
25 . . . Gas analysis unit
40 . . . $O_2$ discharge unit
45 . . . $CO_2$ reduction gas discharge unit
50 . . . Power supply
55 . . . Electrochemical measurement unit
100 . . . Electrolytic device

What is claimed is:

1. An electrolytic cell comprising:
a cathode,
an anode, and
a solid electrolyte having oxide ion conductivity;
wherein
the cathode is following (A) or (B):
(A) the cathode comprises a metal and a first mayenite-type compound, or
(B) the cathode comprises a metal and a second mayenite-type compound, wherein the second mayenite-type compound comprises a mayenite-type compound having electronic conductivity;
each of the first mayenite-type compound and the second mayenite-type compound is a mayenite-type compound having a representative composition represented by $12CaO \cdot 7Al_2O_3$;
the first mayenite-type compound and the second mayenite-type compound are the same or different; and
the mayenite-type compound comprises Al and at least one element selected from the group consisting of Ca and Sr, and a molar ratio of a sum of CaO and SrO to $Al_2O_3$ in terms of oxides is 12.6: 6.4 to 11.7:7.3;
the cathode is a cathode for decomposing carbon dioxide;
the cathode is at least one selected from the group consisting of (a1), (a2), (b1) and (b2):
(a1) the cathode comprising a sintered product of a mixture comprising the powder of the metal and the first mayenite-type compound;
(a2) the cathode comprising a reduced and sintered product of a mixture comprising the powder of an oxide of the metal and the first mayenite-type compound;
(b1) the cathode comprising a sintered product of a mixture comprising the powder of the metal and the second mayenite-type compound, and the second mayenite-type compound has electron conductivity; and
(b2) the cathode comprising a reduced and sintered product of a mixture comprising the powder of the metal oxide and the second mayenite-type compound, and the second mayenite-type compound has electron conductivity;
the solid electrolyte is a third mayenite-type compound;
the third mayenite-type compound is the mayenite-type compound having the representative composition represented by $12CaO \cdot 7Al_2O_3$; and
the third mayenite-type compound is the same as or different from the first mayenite-type compound or the second mayenite-type compound.

2. The electrolytic cell according to claim 1,
wherein the mayenite-type compound comprises:
(i) at least one element selected from the group consisting of B, Si and Ge, and total amount thereof is 0 to 17 mol % in terms of oxides with respect to the mayenite-type compound;
(ii) at least one element selected from the group consisting of Li, Na, and K, and total amount thereof is 0 to 5 mol % in terms of oxides with respect to the mayenite-type compound;
(iii) at least one element selected from the group consisting of Mg and Ba, and total amount thereof is 0 to 10 mol % in terms of oxides with respect to the mayenite-type compound; and
(iv) at least one element selected from the group consisting of:
at least one rare earth element selected from the group consisting of Ce, Pr, Nd, Sm, Eu, Gd, Tb, Dy, Ho, Er, Tm, and Yb,
at least one transition metal element selected from the group consisting of Ti, V, Cr, Mn, Fe, Co, Ni, Cu, Pd, Ir, and Pt, and
at least one typical metal element selected from the group consisting of Zn, Cd, In, and Sn,
and a total amount thereof is 0 to 8 mol % in terms of oxides with respect to the mayenite-type compound.

3. The electrolytic cell according to claim 1,
wherein the anode is the first mayenite-type compound or the second mayenite-type compound.

4. An electrolytic device comprising the electrolytic cell according to claim 1.

5. A method of decomposing carbon dioxide, comprising:
decomposing carbon dioxide into carbon monoxide and oxygen with the electrolytic device according to claim 4.

6. A method for decomposing carbon dioxide using the electrolytic device according to claim 1.

7. A method of decomposing carbon dioxide, comprising:
decomposing carbon dioxide into carbon monoxide and oxygen by using the electrolytic cell according to claim 1.

8. The electrolytic cell according to claim 1,
wherein
in (a1), the cathode comprises a sintered product of a paste-like mixture comprising obtained by mixing the powder of the metal and the first mayenite-type compound by using a dispersion liquid;
in (a2), the cathode comprises a reduced and sintered product of a paste-like mixture obtained by mixing the powder of an oxide of the metal and the first mayenite-type compound by using a dispersion liquid;
in (b1), the cathode comprises a sintered product of a paste-like mixture comprising obtained by mixing the powder of the metal and the second mayenite-type compound by using a dispersion liquid, and the second mayenite-type compound has electron conductivity; and
in (b2), the cathode comprises a reduced and sintered product of a paste-like mixture obtained by mixing the powder of the metal oxide and the second mayenite-type compound by using a dispersion liquid, and the second mayenite-type compound has electron conductivity.

* * * * *